United States Patent [19]

Gardner

[11] Patent Number: 5,016,510
[45] Date of Patent: May 21, 1991

[54] POWER SAW ARRANGEMENT

[76] Inventor: Frederick P. Gardner, 2601 Blakely Ave., Eau Claire, Wis. 54701

[21] Appl. No.: 395,464

[22] Filed: Aug. 18, 1989

[51] Int. Cl.⁵ .................................................. B27B 5/18
[52] U.S. Cl. .................................. 83/471.002; 83/490; 83/698
[58] Field of Search ............... 83/483, 490, 574, 471.2, 83/471.3, 698

[56] References Cited

U.S. PATENT DOCUMENTS

| | | | |
|---|---|---|---|
| 2,496,716 | 2/1950 | Hanna | 83/490 |
| 2,842,168 | 7/1958 | Truchan | 83/490 |
| 3,680,609 | 8/1972 | Menge | 83/471.3 |
| 4,587,875 | 5/1986 | Deley | 83/574 |
| 4,765,098 | 8/1988 | Duff et al. | 83/490 |
| 4,774,866 | 10/1988 | Dehari et al. | 83/490 |

FOREIGN PATENT DOCUMENTS

| | | |
|---|---|---|
| 271755 | 6/1988 | European Pat. Off. |
| 2630453 | 11/1977 | Fed. Rep. of Germany |

OTHER PUBLICATIONS 2 p. drawing, prototype built by Partner Industrial Products in 1975.

*Primary Examiner*—Hien H. Phan
*Attorney, Agent, or Firm*—Merchant, Gould, Smith, Edell, Welter & Schmidt

[57] ABSTRACT

An improved power saw arrangement includes a base of the type which is adapted to rest on a flat, horizontal surface, a support member pivotally mounted to an upper surface of the base and a power saw assembly which is releasably secured to the support member. The power saw assembly is provided with an overhead handle portion and a U-shaped handle portion which wraps around its main body and is substantially perpendicular to the overhead handle portion. When secured to the support member, the overhead handle portion may be used, and the saw assembly can function as a chop saw. The power saw assembly can further function as a cutoff saw by unsecuring it from the support member and using the U-shaped handle portion. Novel structure for effecting releasability of the power saw assembly from the support member, and for limiting the pivotal motion of the support member relative to the base are also disclosed.

22 Claims, 4 Drawing Sheets

POWER SAW ARRANGEMENT

BACKGROUND OF THE INVENTION

1. Field of the Invention

This invention relates to power saw arrangements of the type which are used to cut pipe or other workpieces. More specifically, this invention relates to an improved power saw arrangement which can be utilized as a chop saw or separated into two separate units for use as a cut-off saw.

2. Description of the Prior Art

In order to perform an efficient, workmanlike job on a project, today's construction professionals must be equipped with an ever-increasing array of tools. One such tool is the chop saw, in which a circular-type saw is pivotally mounted for movement between a raised rest position and a lowered operational position. Chop saws are most commonly used to cut pipe or other elongate workpieces. However, because they usually include a fairly weighty base portion and mounting structure, chop saws are not particularly suited for other types of cutting jobs. For this reason, it is often necessary to be equipped with a second, portable circular saw, or a "cut-off saw", for use on workpieces which do not lend themselves to cutting with the chop saw.

It is both expensive and logistically difficult for construction professionals to equip themselves with both a chop saw and a cut-off saw. This is particularly the case when a project needs to be completed in a remote area, or where the nature of the project requires a number of different expensive, bulky tools.

It is clear that there has existed a long and unfilled need in the prior art for a chop saw which is conveniently and inexpensively convertible into a cut-off saw, and which has a design which does not compromise its operation and efficiency either as a chop saw or as a cut-off saw.

SUMMARY OF THE INVENTION

Accordingly, it is an object of the invention to provide a chop saw which is conveniently and inexpensively convertible into a cut-off saw.

It is further an object of the invention to provide a sawing assembly which is convertible from a chop saw into a cut-off saw, which is effective in operation both as a chop saw and as a cut-off saw.

A third object of the invention is to provide a novel and effective arrangement for releasably limiting the degree to which a saw in a chop saw assembly may be retracted.

In order to achieve these and other objects of the invention, the present invention provides an improved power saw arrangement which includes a base having an upper surface, a power saw assembly, a support member pivotally mounted to the upper surface of the base; structure for releasably securing the power saw assembly to the support member; and structure for biasing the support member with respect to the base in a first angular direction, so that power saw is biased away from the upper surface toward a non-cutting position, whereby the power saw assembly may be used as a chop saw when secured to the support member, and as a cut-off saw when it is not secured to the support member.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
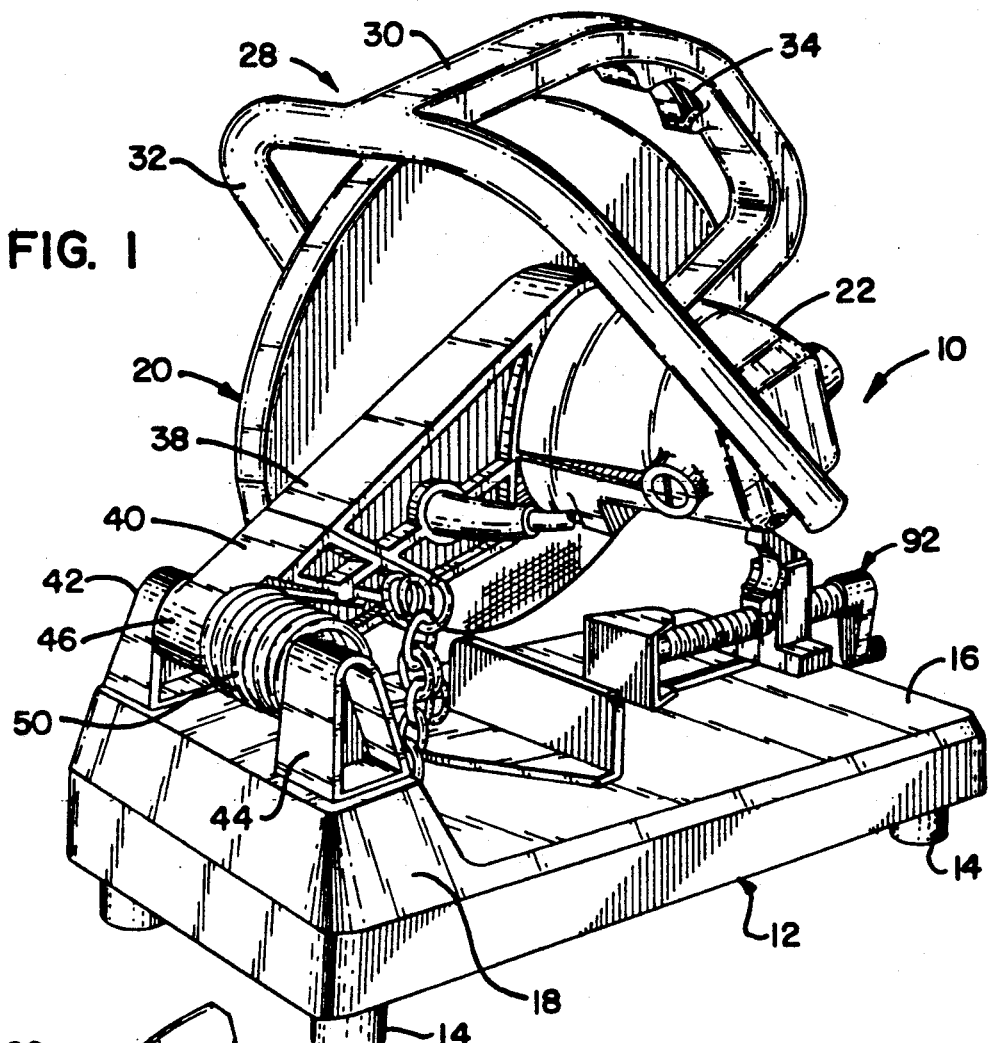
FIG. 1 is a perspective view of an improved power saw arrangement constructed according to a first embodiment of the invention.

Referring now the drawings, wherein like reference numerals designate corresponding structure throughout the views, and referring in particular to FIG. 1, an improved power saw arrangement 10 according to a first preferred embodiment of the invention includes a base 12 which is supportable upon a horizontal support surface by four support feet 14. As may be seen in FIG. 1, base 12 has an upper surface 16 which is elevated at one end thereof to form a pedestal portion 18.

Figure 2:
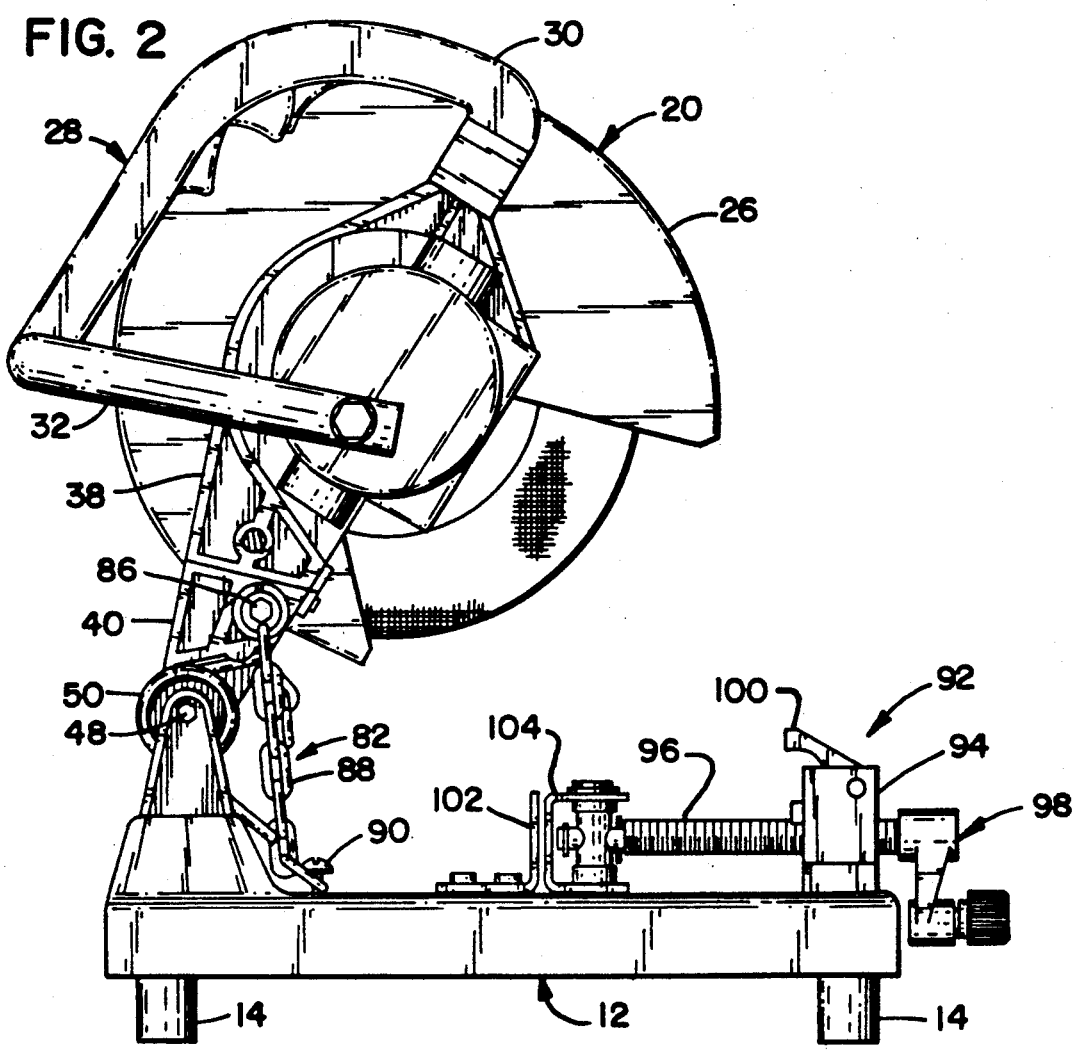
FIG. 2 is a side elevational view of a power saw arrangement constructed according to the embodiment of FIG. 1.

Referring now to FIGS. 1 and 2, the improved power saw arrangement 10 includes a power saw assembly 20 having an electric drive motor 22 which is connected to a rotary saw blade 24 by a conventional shaft arrangement. Assembly 20 has a main body portion which includes the housing end bearings for motor 22, and other elements integral thereto which are conventional in rotary electric saws of this general type. A saw blade guard 26 is provided around approximately three fourths of the periphery of rotary saw blade 24, as may be seen clearly in FIG. 2. The specific design of drive motor 22, saw blade 24 and guard 26 is not critical to the invention and is of conventional design.

As may best be seen in FIG. 1, power saw assembly 20 is provided with a novel handle member 28. Handle member 28 includes an overhead portion 30, which is adapted for gripping by an operator when the power saw assembly 20 is to be used as a chop saw. Handle member 28 further includes a second U-shaped portion 32 which is convenient for use when the power saw assembly 20 is used, separately of the remainder of saw arrangement 10, as a cut-off saw. The first overhead handle portion 30 is unitary at a first end thereof with the second U-shaped handle portion 32, and is secured so as to be integral with the body or casing of the power saw assembly 20 at its second end. As may be seen in FIG. 1, the first overhead handle portion 30 is substantially positioned within a first plane which is parallel to a plane in which the rotary saw blade 24 is disposed. The second U-shaped handle portion 32 is positioned substantially within a second plane which is perpendicular to the first plane in which first overhead handle portion 30 is disposed, and has first and second ends which are both secured by conventional fastening structure to the main body of power saw assembly 20, as is clearly shown in FIG. 2. The first overhead handle portion 30 has a conventional electric trigger switch 34 inserted in a recess which is defined in an inner surface thereof. Trigger switch 34 controls the flow of electricity from a power cord 36 to the electric drive motor 22 in a manner that is old and well-known in electric saws of this type.

Figure 4:
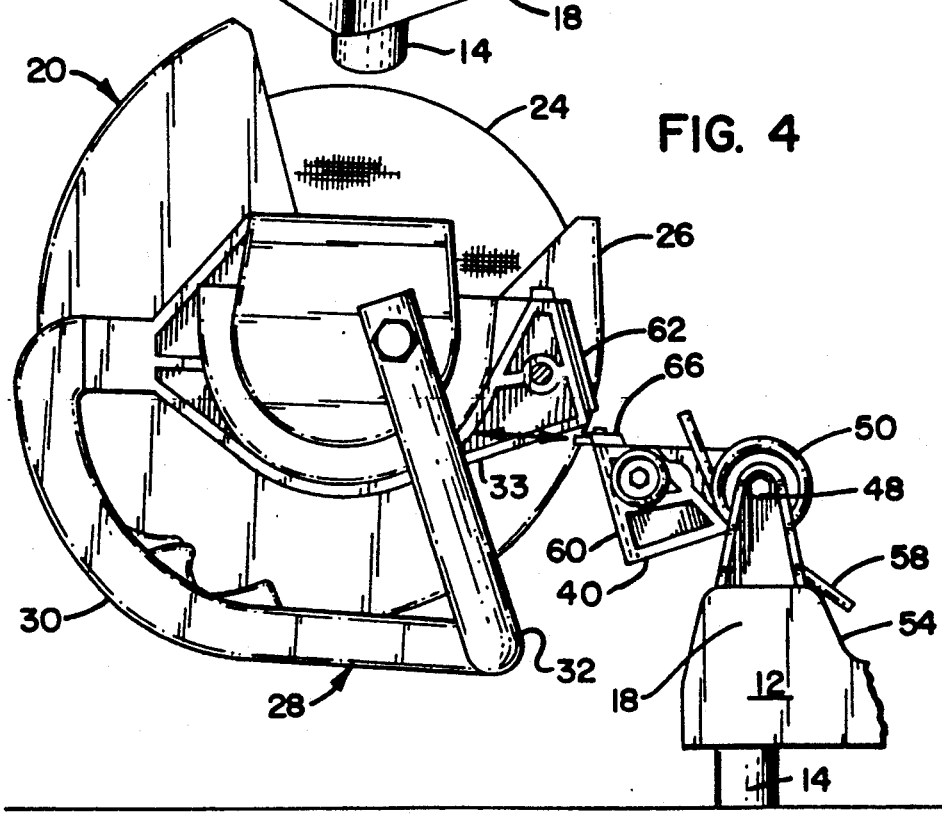
FIG. 4 is a side elevational view of the power saw arrangement depicted in FIGS. 1-3, in a third operational position.

Referring again to FIG. 1, a mounting boss member 38 is provided which is integral with the main body of power saw assembly 20, and depends downwardly from the casing of electric drive motor 22 and guard 26. A support block 40 is pivotally mounted with respect to the pedestal portion 18 of base 12 by a first bearing block 42 and a second bearing block 44. The pivotable support block 40 is provided with a collar portion 46 that has an internal bore (not shown) defined therein for receiving a pivot pin 48, as may be seen in FIG. 3. As a result, the pivotable support block 40 is pivotable about the pivot pin 48, which is supported within the first and second bearing blocks 42, 44. Referring briefly to FIG. 4, a torsion spring 50 is disposed about one end of the collar portion 46 of pivotable support block 40. Torsion spring 50 has a first end 56 which bears against a surface 52 on pivotable support block 40, and a second end 58 which bears against a surface 54 on the pedestal portion 18 of base 12. As a result, torsion spring 50 biases the pivotable support block 40 with respect to base 12 in a first angular direction, which is counterclockwise in the view which is provided in FIG. 4.

According to one advantageous aspect of the invention, mounting boss 38 is releasably mounted to pivotable support block 40, so that the power saw assembly 20 is supported for pivotal movement about pivot pin 48. As a result, the entire power saw assembly 20 is ordinarily biased toward a non-cutting position, whereby blade 24 is retracted from the upper surface 16 of base 12.

Figure 5:
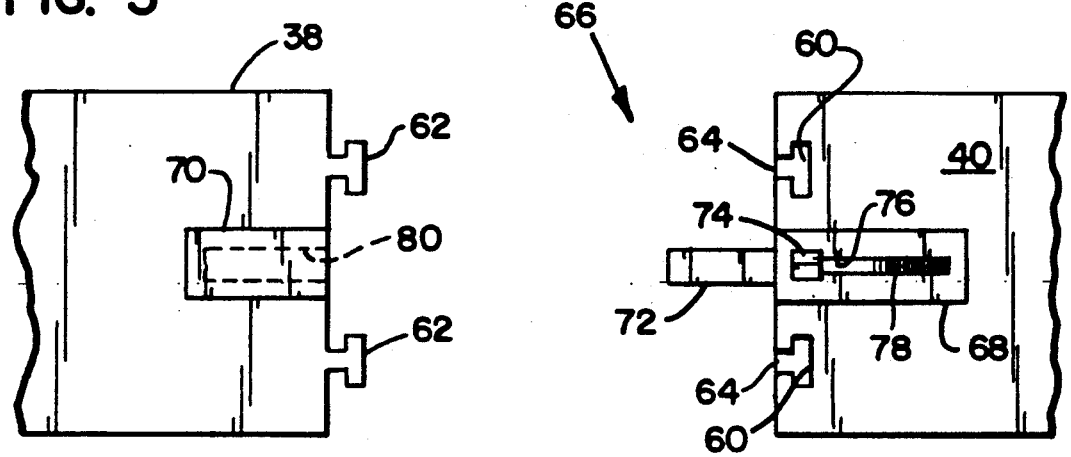
FIG. 5 is a fragmentary view of a latch mechanism which is used in the power saw arrangement depicted in FIGS. 1-4.
Figure 8:
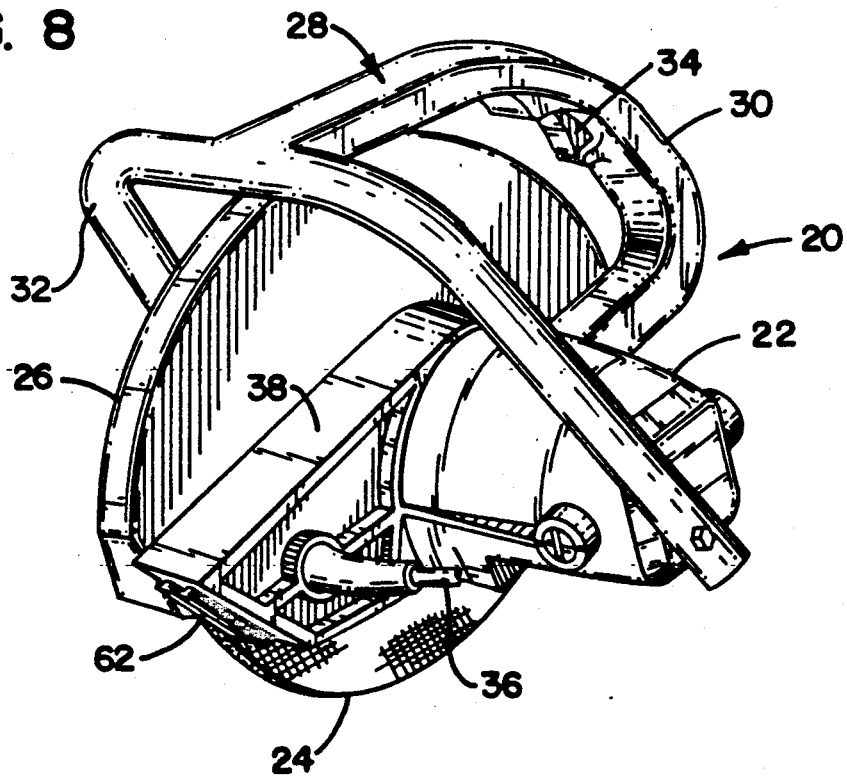
FIG. 8 is an isolated perspective view of a power saw assembly according to either of the illustrated embodiments of the invention.

As may best be seen in FIGS. 4, 5 and 8, mounting boss 38 is provided with a pair of guide rails 62, which extend in a spaced, parallel relationship. In the preferred embodiment, each guide rail 62 has a T-shaped cross section, with the broad edge of the T being parallel to an end surface of the mounting boss 38. Each of the guide rails 62 are shaped so as to be complementarily received within corresponding guide tracks 60, which are defined in an end surface of the pivotable support block 40. A stop surface 64 is provided at one end of each of the guide tracks 60 to constrain the guide rails 62 against longitudinal movement in a first direction within the guide track 60. A latch mechanism 66 is provided to releasably constrain the mounting boss 38 against movement in a second, opposite direction. As is best illustrated in FIG. 5, latch mechanism 66 includes a latch housing 68 which is mounted on an outer surface of pivotable support block 40, and a latch receiving box 70, which is aligned with the latch housing 68 and is mounted on a corresponding outside surface of the mounting boss 38. A latch member 72 is provided for sliding, longitudinal movement within latch housing 68. Latch 72 has an integral or unitary knob 74, which is slidable within a track 76 that is longitudinally defined within the latch housing 68. Latch member 72 is biased in a direction which, when mounting boss 38 is secured to pivotable support block 40, is toward a recess 80 which is defined longitudinally within the latch receiving box 70. This biasing is effected by a compression spring 78 which is provided within the latch housing 68.

Another advantageous feature of the invention is the provision of a resilient mechanism which is used to limit the degree to which pivotal support block 40 and the attached power saw assembly 20 may pivot in the first rotational direction toward a non-cutting position. This releasable limiting mechanism 82 in the preferred embodiment comprises a resilient coiled spring member 84 which is secured at a first end to a side surface of pivotable support block 40 by a spring mounting bolt 86, as is best illustrated in FIGS. 1 and 2. Coiled spring 84 at its second end includes an exposed coil portion which forms a hook upon which a flexible member such as a link chain 88 may be hooked. The link chain 88 is secured to base 12 at its second end by a base retention bolt 90.

As is best shown in FIGS. 1 and 2, a workpiece clamping mechanism 92 is secured to the upper surface 16 of base 12. Workpiece clamping mechanism 92 includes a pillow block 94 which has an internal threaded bore for receiving a threaded rod 96. Threaded rod 96 is connected at its first end with a crank handle 98 which is fixed thereto, and at its second end to a movable clamping jaw 104 via a pivot joint. A quick release lever 100 is also provided on box 94. Movable clamping jaw 104 is positioned in opposed relation to a stationary clamping jaw 102. By turning crank handle 98, movable clamping jaw 104 is thus movable in opposition with respect to stationary clamping jaw 102, whereby a workpiece may be clamped therebetween prior to cutting with the power saw assembly 20.

Figure 6:
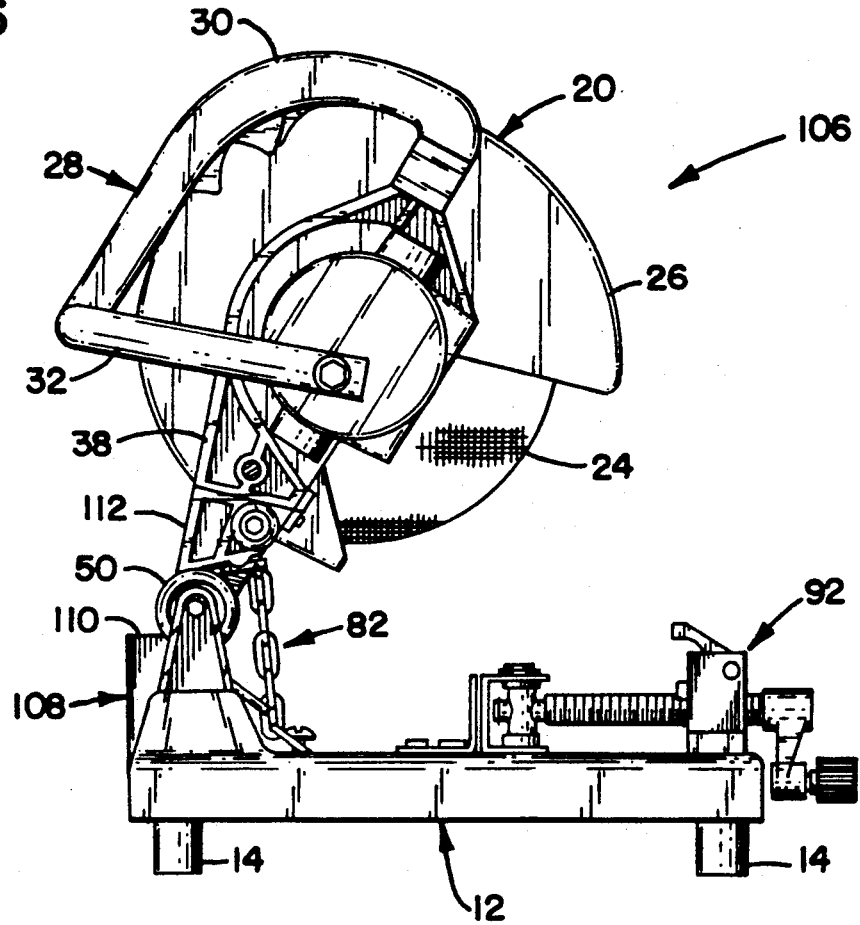
FIG. 6 is a side elevational view of an improved power saw arrangement constructed to a second embodiment of the invention shown in a first operational position.
Figure 7:
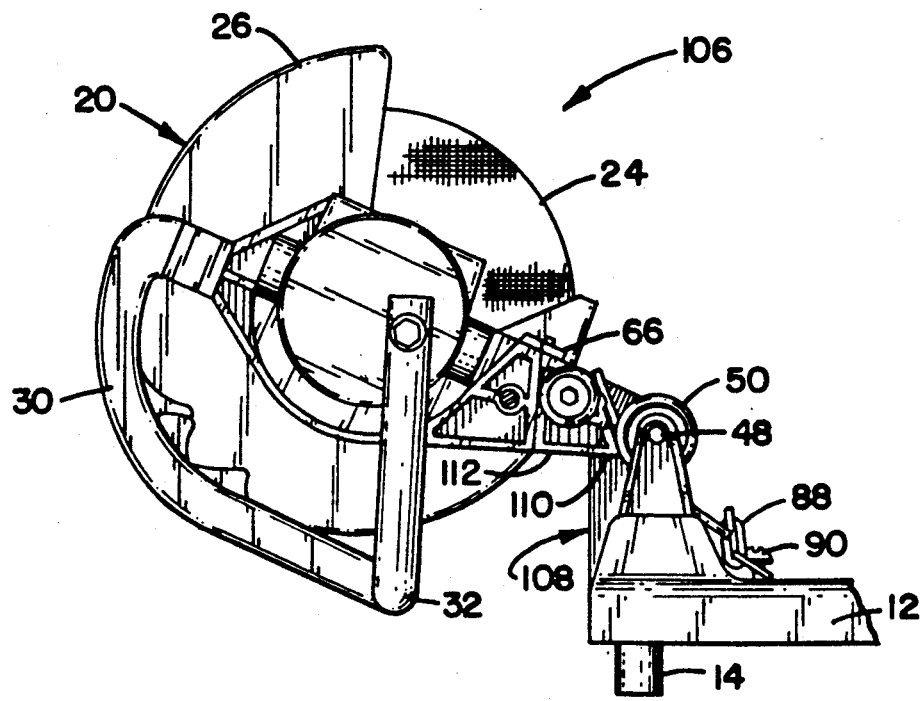
FIG. 7 is a side elevational view of the power saw arrangement depicted in FIG. 6, shown in a second operational position.

In a second embodiment 106 of the invention, which is depicted in FIGS. 6 and 7, base 12 is further provided with a stop block 108. Stop block 108 has an upper surface 110 which is positioned to abut against a rear surface 112 of the pivotable support block 40 when support block 40 is pivoted in the first rotational direction. As may be seen in FIG. 7, stop block 108 is positioned so that power saw assembly will be suspended above the support surface upon which base 12 is supported when the power saw assembly is tilted rearwardly in the first rotational direction.

The manner in which an improved power saw arrangement according to the invention is operated will now be described. If an operator desires to use the power saw assembly 20 as a chop saw, a workpiece is positioned relative to blade 24 by clamping it between the movable and stationary clamping jaws 104, 102. Alternatively, a large workpiece may be positioned loosely on top of the workpiece clamping mechanism 92 and secured by an external support mechanism. Once the workpiece is positioned, an operator then grasps the first overhead handle portion 30 of handle member 28, pulls the trigger switch 34 and pivots the power saw assembly downwardly toward the workpiece against the reverse bias which is exerted by the torsion spring 50. When the desired cut has been effected upon the workpiece, the operator releases pressure on the first overhead handle portion 30, and torsion spring 50 causes the power saw assembly 20 to pivot in the first rotational direction, until further pivotal movement is prevented by the releasable limiting mechanism 82. Because of the resiliency of coiled spring 84 in the releasable limiting mechanism 82, any sudden tension transmitted by link chain 88 onto pivotable support block 40 will be dampened, so that it will not jar the power saw assembly 20 or the operator.

Figure 3:
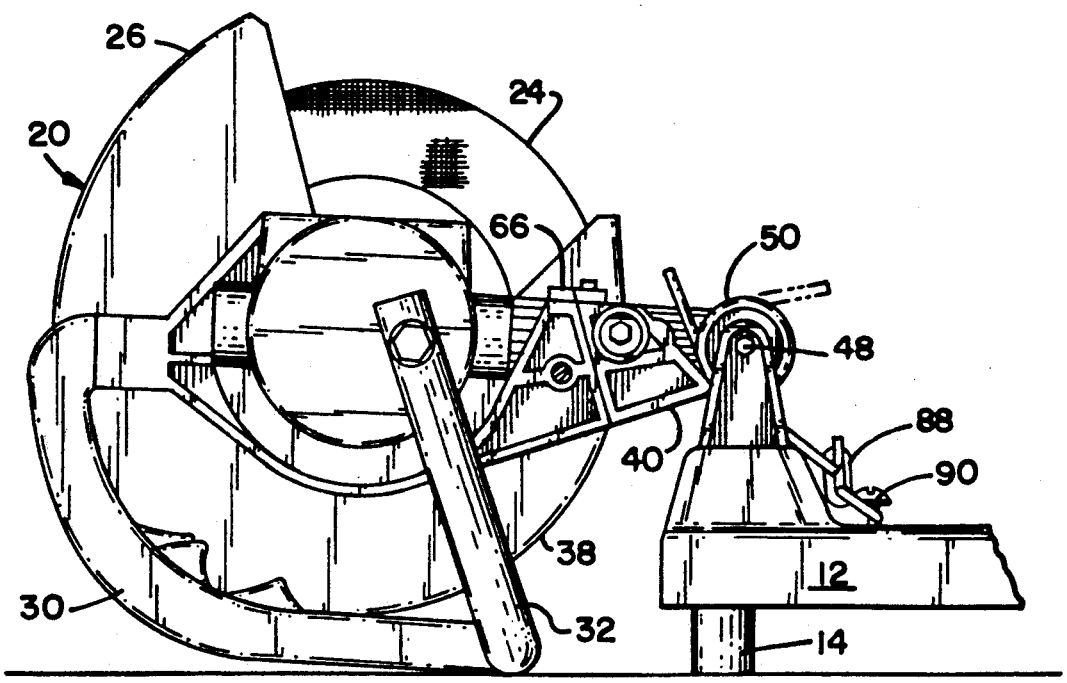
FIG. 3 is a side elevational view of the power saw arrangement depicted in FIG. 2, in a second operational position.

If an operator decides to use power saw assembly 20 as a cut-off saw, he will exert a slight downward pressure on the first overhead handle portion 30, which causes link chain 88 in releasable limiting mechanism 82 to slacken. At this point, link chain 88 is unhooked from the exposed end coil portion of the coiled spring 84. The operator then releases pressure on the first overhead handle portion 30, causing the torsion spring 50 to pivot the power saw assembly 20 to the position which is illustrated in FIG. 3 for a saw arrangement 10 which is constructed according to the embodiment of FIGS. 1-5, or to the position which is depicted in FIG. 7 for a saw arrangement 106 which is constructed according to the embodiment of FIGS. 6 and 7. For a saw arrangement 10 constructed according to the first embodiment, the operator then lifts power saw assembly 20 slightly to the position which is illustrated in FIG. 4, places a finger or thumb on the knob 74 of latch mechanism 66, and manually retracts latch 72 from recess 80, against the biasing of compression spring 78. Once the latch member 72 is completely withdrawn from the recess 80 and latch receiving box 70, the operator again lifts power saw assembly 20, thus causing the mounting boss 38 and its associated guide rails 62 to slide out of the guide tracks 60 in pivotable support block 40. As a result, the power saw assembly 20 becomes an independent, portable unit which may be used as a cut-off saw.

To use the power saw assembly 20 as a cut-off, the operator grips one side or another of the second U-shaped handle portion 32, which allows the operator to make a cut which requires blade 24 to be positioned in a plane other than strictly perpendicularly to the ground. Thus, the combination of the compound handle member 28 and the portability of the power saw assembly 20 give a saw arrangement 10, constructed according to the invention, flexibility which is far beyond that of conventional chop saws.

The power saw assembly 20 in the second embodiment 106 would be detached in a manner identical to that described above with reference to the first embodiment, except that no initial lifting of the power saw assembly 20 is required prior to unlatching the latch mechanism 66.

If the operator desires to reconvert the power saw assembly 20 to a chop saw, the mounting boss 38 and associated guide rails 62 are again slid into the corresponding guide tracks 60, until one end of the guide rail 62 contacts stop surface 64. Knob 74 is then released by the operator, causing the compression spring 78 to bias latch 72 into position within the recess 80 in latch receiving box 70. The operator then grabs first overhead handle portion 30 and pivots the power saw assembly 20 forwardly to a distance sufficient to allow the hooking of link chain 88 on the exposed end coil portion of coiled spring 84. The operator then releases pressure on first overhead handle portion 30, and a workpiece may again be secured in position for cutting.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. An improved power saw arrangement which is convertible between a chop-saw and a cut-off saw, comprising:
   a base having an upper surface;
   a power saw assembly;
   a support member pivotally mounted to said upper surface of said base;
   means for releasably securing said power saw assembly to said support member, said securing means comprising at least one guide rail on one of said support member and power saw assembly which slidingly engages at least one guide track in the other of said support member and power saw assembly and a movable looking member for selectively locking said guide rail in said guide track; and
   means for biasing said support member with respect to said base in a first angular direction, so that said power saw is biased away from said upper surface toward a non-cutting position, whereby said power saw assembly may be used as a chop saw when secured to said support member, and as a cut-off saw when it is not secured to said support member.

2. An arrangement according to claim 1, wherein said base has a raised pedestal portion, said support member being pivotally mounted to said pedestal portion.

3. An arrangement according to claim 1, wherein said power saw assembly comprises an electrically powered rotary blade saw.

4. An arrangement according to claim 3, wherein said power saw assembly further comprises a handle member which has a first portion that is substantially disposed within a first plane which is parallel to a plane in which the rotary blade of said saw is disposed, said first portion being convenient for use when said power saw assembly is in use as a chop saw; and a second portion which is substantially disposed at least in part within a second plane which is perpendicular to said first plane, said second portion being convenient for use when said power saw assembly is in use as a cut-off saw.

5. An arrangement according to claim 1, further comprising releasable means for limiting movement of said support member in the first angular direction.

6. An arrangement according to claim 5, wherein said limiting movement means comprises a hook member which is connected to said support member and a flexible member which is connected to said base, said flexible member being securable to said hook member to limit movement of said support member, and wherein said hook member is elastic so as to reduce any strain against said limiting means.

7. An arrangement according to claim 6, wherein said hook member comprises a helical spring which has an exposed end coil to which said flexible member may be secured.

8. An arrangement according to claim 6, wherein said flexible member comprises a link chain.

9. An arrangement according to claim 1, wherein said releasably securing means further comprises a boss member which is connected to said power saw assembly.

10. An arrangement according to claim 1, wherein said movable locking member comprises a latch mechanism adjacent one end of said guide track.

11. An arrangement according to claim 10, wherein said latch mechanism is spring biased.

12. An arrangement according to claim 1, wherein said biasing means comprises a torsion spring.

13. An improved arrangement for holding a power saw, comprising:
 a base having an upper surface;
 a support member pivotally mounted to said upper surface of said base;
 means adapted for releasably securing a power saw assembly to said support member, said securing means comprising at least one guide rail on one of said support member and power saw assembly which slidingly engages at least one guide track in the other of said support member and power saw assembly and a movable locking member for selectively locking said guide rail in said guide track; and
 means for biasing said support member with respect to said base in a first angular direction, so that said power saw is biased away from said upper surface toward a non-cutting position, whereby the power saw assembly may be used as a chop saw when secured to said support member, and as a cut-off saw when it is not secured to said support member.

14. An arrangement according to claim 13, wherein said base has a raised pedestal portion, said support member being pivotally mounted to said pedestal portion.

15. An arrangement according to claim 13, further comprising releasable means for limiting movement of said support member in the first angular direction.

16. An arrangement according to claim 15, wherein said limiting movement means comprises a hook member which is connected to said support member and a flexible member which is connected to said base, said flexible member being securable to said hook member to limit movement of said support member, and wherein said hook member is elastic so as to soften any strain against said limiting means.

17. An arrangement according to claim 16, wherein said hook member comprises a helical spring which has an exposed end coil to which said flexible member may be secured.

18. An arrangement according to claim 16, wherein said flexible member comprises a link chain.

19. An arrangement according to claim 13, wherein said releasably securing means further comprises a boss member which is connected to said power saw assembly.

20. An arrangement according to claim 13, wherein said movable locking member comprises a latch mechanism adjacent one end of said guide track.

21. An arrangement according to claim 20, wherein said latch mechanism is spring-biased.

22. An arrangement according to claim 13, wherein said biasing means comprises a torsion spring.

* * * * *